United States Patent [19]

Fray

[11] Patent Number: 5,275,361
[45] Date of Patent: Jan. 4, 1994

[54] VENTING A SPACE TO RELIEVE PRESSURE GENERATED BY AN EXPLOSION

[75] Inventor: Joseph Fray, Woodford, Great Britain

[73] Assignee: British Aerospace Public Limited Company, London, England

[21] Appl. No.: 897,495

[22] Filed: Jun. 12, 1992

[30] Foreign Application Priority Data

Jun. 15, 1991 [GB] United Kingdom ............... 9112928

[51] Int. Cl.$^5$ .............................................. B64C 1/00
[52] U.S. Cl. ................... 244/129.1; 244/118.1
[58] Field of Search ............... 244/118.1, 118.5, 119, 244/129.1; 220/89.4, 207, 261, 900; 52/1; 89/1.14

[56] References Cited

U.S. PATENT DOCUMENTS

| | | | |
|---|---|---|---|
| 3,454,245 | 7/1969 | Burkdoll et al. | 244/137.1 |
| 3,486,410 | 12/1969 | Drexelius et al. | 89/1.14 |
| 3,712,221 | 1/1973 | Voigt, Jr. et al. | 89/1.14 |
| 3,778,010 | 12/1973 | Potts et al. | 244/121 |
| 3,885,761 | 5/1975 | Pendergast et al. | 244/121 |
| 4,049,221 | 9/1977 | Fountain | 244/118.1 |
| 4,407,468 | 11/1983 | Bernent et al. | 89/1.14 |
| 4,893,049 | 1/1990 | Bundy et al. | 310/338 |
| 4,960,249 | 10/1990 | Signoret et al. | 244/118.5 |
| 5,046,686 | 9/1991 | Carla et al. | 244/118.5 |

FOREIGN PATENT DOCUMENTS

| | | |
|---|---|---|
| 1557281 | 2/1969 | France . |
| 9107337 | 5/1991 | PCT Int'l Appl. . |
| 0335447 | 2/1959 | Switzerland . |
| 1207422 | 9/1970 | United Kingdom . |
| 2076148 | 11/1981 | United Kingdom . |

Primary Examiner—Michael S. Huppert
Assistant Examiner—Anne E. Bidwell
Attorney, Agent, or Firm—Cushman, Darby & Cushman

[57] ABSTRACT

An arrangement for venting a destructive internal pressure generated by an explosion within an enclosure, such as aircraft fuselage. The arrangement includes a pressure venting device for venting an exterior boundary, fuselage skin, of the enclosure; and an explosion sensitive sensor located within the enclosure. In response to an explosion within the enclosure, the sensor will send a signal to the pressure venting device. The pressure venting device creates a pressure relieving vent in the exterior boundary in advance of build up of destructive internal pressure within the enclosure.

2 Claims, 1 Drawing Sheet

VENTING A SPACE TO RELIEVE PRESSURE GENERATED BY AN EXPLOSION

BACKGROUND TO THE INVENTION

This invention relates to an arrangement for venting an enclosed space to relieve pressure generated by an explosion. More particularly, though not exclusively, it relates to an arrangement for venting an aircraft fuselage, in response to an explosion in a container, for example a freight container, stowed within the fuselage.

DESCRIPTION OF THE PRIOR ART

The object of the present invention is to provide means for venting an enclosed space, such as an aircraft fuselage, in advance of a destructive pressure build up arising from an on-board explosion whereby the risk of catastrophic structural failure is minimised. One obvious method of relieving excessive pressure arising from such an explosion is by providing "blow-out" panels in the fuselage skin, these panels being designed to be significantly weaker than the remainder of the fuselage. A problem with the "blow-out" panel concept is that in order to demonstrate the structural airworthiness of the aircraft, it is necessary to show that the fuselage, including any such "blow-out" panels, is capable of withstanding twice the maximum cabin pressure differential. Hence, for the simple blow-out concept to work, the greater part of the fuselage would have to be designed to withstand in excess of 2/P, which would constitute an unacceptable weight penalty.

SUMMARY OF THE INVENTION

If however, it were possible to weaken one or more pre-designated areas of a "normal" fuselage, that is one designed to meet standard airworthiness requirements, in the time interval between the initiation of an explosion and the development of an excessive and catastrophic pressure build-up at the fuselage skin, so that the weakened areas acted effectively as blow-out panels, the probability of the aeroplane surviving the explosion would be greatly increased.

According to the present invention there is provided an arrangement for venting an enclosure to atmosphere in advance of a destructive internal pressure generated by an explosion within said enclosure, said arrangement including pressure venting means to vent an exterior boundary of said enclosure and explosion sensitive sensor means located within said enclosure whereby, in response to an explosion within said enclosure said sensor means will send a signal to the pressure venting means and cause same to create a pressure relieving vent in said exterior boundary.

BRIEF DESCRIPTION OF THE DRAWINGS

One embodiment of the present invention will now be described, by way of example only, and with reference to the following drawings in which.

DESCRIPTION OF PREFERRED EMBODIMENT

Figure 1:
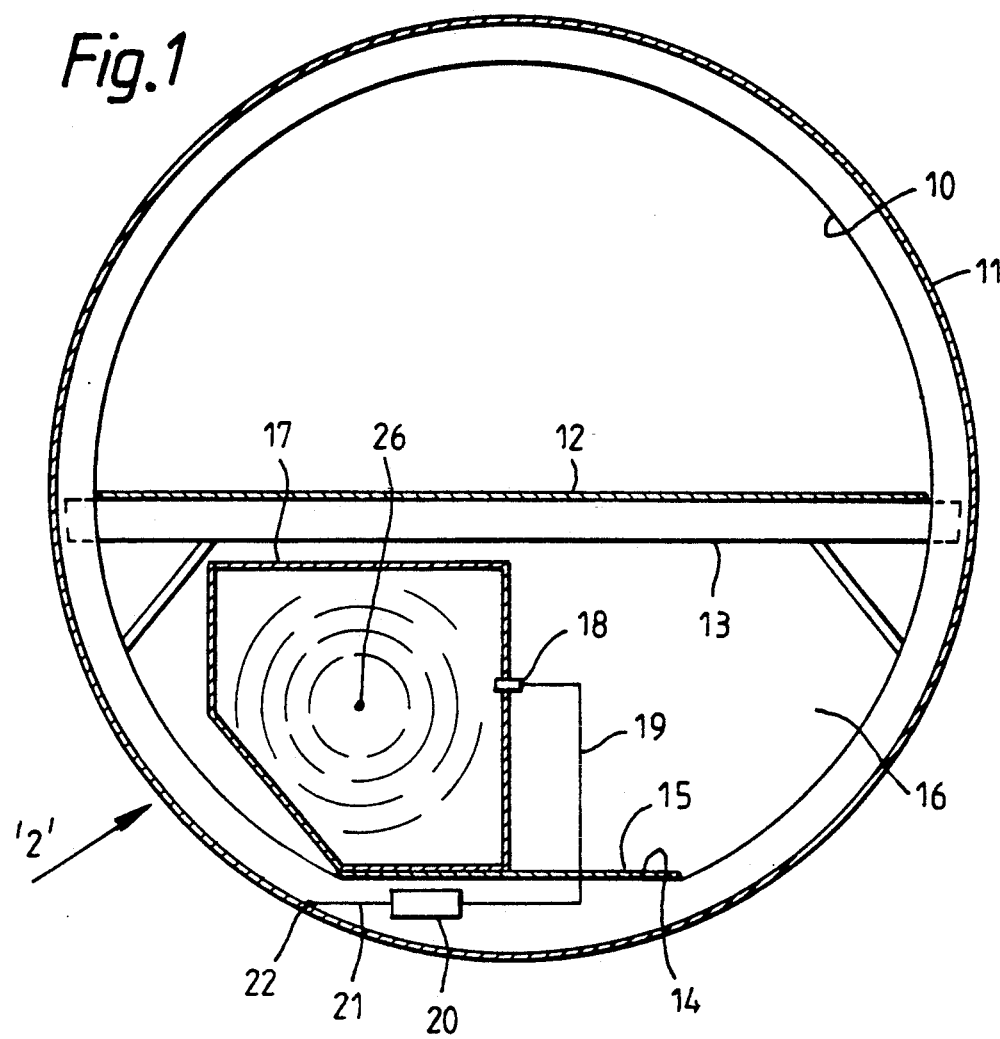
FIG. 1 illustrates a typical cross section through an aircraft fuselage incorporating one arrangement of the present invention.

Referring to the drawings, FIG. 1 illustrates a typical cross-section through an aircraft fuselage comprising a fuselage frame 10 supporting an outer skin 11. A floor panel 12 seats upon a floor beam 13. The lower part of the frame 10 includes an horizontal portion 14 incorporating a freight floor 15. The freight floor includes, but is not illustrated here, means for transporting and locating freight containers along the length of a freight bay 16. One typical freight container 17 is shown by way of example.

Sensor means in the form of an explosion sensor 18, in this embodiment located in one wall of the freight container 17 is connected by a signal transmitting line 19 to pressure vent actuating means in the form of detonating means 20 which in turn includes a transmitting line 21 to pressure venting means in the form of a circuit 22 of explosive cord 23 defining the boundary of an effective blow out panel 24. It should be noted that the blow-out panel 24 is of a pre-determined area and location within the fuselage and multiple areas may be allocated dependent upon requirements. It should also be noted, as previously discussed, that the skin panel thickness in the vicinity, is consistent with the remainder of the fuselage.

Figures 2, 3:
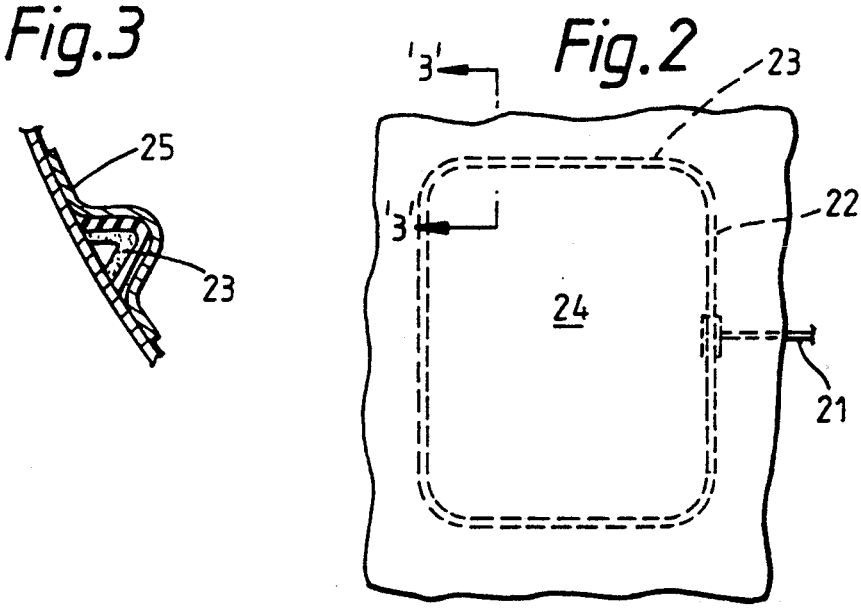
FIG. 2 is a view in direction of arrow '2' in FIG. 1 illustrating one typical pressure venting panel arrangement of the present invention.
FIG. 3 is a localised section through the fuselage outer skin taken along a line '3—3' in FIG. 2.

Referring to FIG. 3, the explosive 23 is of the well-known 'chevron' cutting type cord seated in contact with the inner skin surface and supported within a rubber or like material moulding and located to the skin by suitable attachments 25. The chevron cutting cord 23, being a line charge when activated, as will be later described, will impose a cutting forced on the skin enabling the blow-out panel 24 to separate from the surrounding skin effectively relieving excess pressure arising from an explosion in the freight container. For the purpose of this embodiment the seat of the explosion is deemed to be at location 26.

Since electrons travel more quickly than pressure waves an essential feature of the present invention is that the cutting cord detonation and thus the formation of the blow-out panel is initialised ahead of the pressure wave by an electronic signal from as close as possible to the source of the pressure wave. Thus the location of the sensor 18 is in the wall of the container, although other locations external to the container may be equally effective. To ensure this advanced initiation the sensor 18 will preferably be one sensitive to heat or light in preference to one which is pressure sensitive. This will ensure that the detector generates a signal adequately ahead of any catastrophic build-up in pressure.

The present embodiment is specifically related to an occurrence within a freight container since this is the most likely situation. However, the invention may be equally applicable to an explosion occurring within the freight bay, or perhaps some other 'in-fuselage' location.

I claim:

1. An arrangement for venting to atmosphere an enclosure to relieve destructive internal pressure generated by an explosion within said enclosure, said arrangement including:
    pressure venting means for creating a pressure relieving vent in an exterior boundary of said enclosure;
    explosion sensitive sensor means located within said enclosure which in response to an explosion within said enclosure, sends a signal to the pressure venting means to create the pressure relieving vent in said exterior boundary in advance of build up of destructive internal pressure within the enclosure; and wherein said enclosure is an aircraft fuselage and said pressure venting means is mounted upon or adjacent an inner surface of a fuselage skin.

2. An arrangement for venting to atmosphere an enclosure to relieve destructive internal pressure generated by an explosion within said enclosure, said arrangement including:

pressure venting means for creating a pressure relieving vent in an exterior boundary of said enclosure; and explosion sensitive sensor means located within said enclosure which, in response to an explosion within said enclosure, sends a signal to the pressure venting means to create the pressure relieving vent in said exterior boundary in advance of build up of destructive internal pressure within the enclosure; wherein said enclosure is an aircraft fuselage and said pressure venting means is mounted upon or adjacent an inner surface of a fuselage skin; and said fuselage includes freight container carrying means for carrying freight and including at least one freight container, said at least one freight container including said explosion sensitive sensor means.

* * * * *